US010692494B2

(12) United States Patent
Dasgupta (10) Patent No.: US 10,692,494 B2
(45) Date of Patent: Jun. 23, 2020

(54) APPLICATION-INDEPENDENT CONTENT TRANSLATION (71) Applicant: Sattam Dasgupta, Bangalore, Karnataka (IN)

(72) Inventor: Sattam Dasgupta, Bangalore (IN)

(73) Assignee: Sattam Dasgupta, Bangalore, Karnataka (IN)

(*) Notice: Subject to any disclaimer, the term of this patent is extended or adjusted under 35 U.S.C. 154(b) by 162 days.

(21) Appl. No.: 15/975,784

(22) Filed: May 10, 2018

(65) Prior Publication Data
US 2018/0330732 A1 Nov. 15, 2018

Related U.S. Application Data (60) Provisional application No. 62/503,956, filed on May 10, 2017.

(51) Int. Cl.
| G10L 15/22 | (2006.01) |
| G06F 3/16 | (2006.01) |
| G06F 3/0481 | (2013.01) |
| G06F 3/0484 | (2013.01) |
| G10L 13/04 | (2013.01) |
| G10L 15/26 | (2006.01) |
| G06F 3/0482 | (2013.01) |
| G10L 13/00 | (2006.01) |

(52) U.S. Cl.
CPC ............ *G10L 15/22* (2013.01); *G06F 3/0482* (2013.01); *G06F 3/0484* (2013.01); *G06F 3/04817* (2013.01); *G06F 3/165* (2013.01); *G06F 3/167* (2013.01); *G10L 13/00* (2013.01); *G10L 13/043* (2013.01); *G10L 15/26* (2013.01); *G10L 15/265* (2013.01)

(58) Field of Classification Search
CPC ....... G10L 15/22; G10L 13/00; G10L 13/043; G10L 15/26; G10L 15/265; G06F 3/04817; G06F 3/0482; G06F 3/0484; G06F 3/165; G06F 3/167
See application file for complete search history.

(56) References Cited

U.S. PATENT DOCUMENTS

| 8,788,620 B2* | 7/2014 | Ativanichayaphong ..... H04L 29/08072 709/218 |
| 10,311,857 B2* | 6/2019 | Kepner ................. H04L 51/066 |
| 2002/0055844 A1* | 5/2002 | L'Esperance ......... H04M 1/271 704/260 |

(Continued)

*Primary Examiner* — Fariba Sirjani
(74) *Attorney, Agent, or Firm* — Prakash Nama; Global IP Services, PLLC (57) ABSTRACT Techniques for providing application-independent content translation in an electronic device are disclosed. In one embodiment, a trigger may be received to activate a first application. Upon receiving the trigger to activate the first application, the first application may be enabled to display at least one visual indicator associated with the first application on a graphical user interface associated with a second application. The first application and the second application are to simultaneously run in an electronic device and the at least one visual indicator may be superimposed on the graphical user interface. Further, content on the graphical user interface may be translated from text-to-speech or speech-to-text in response to selecting the at least one visual indicator.

20 Claims, 9 Drawing Sheets (56) References Cited

U.S. PATENT DOCUMENTS

| | | | |
|---|---|---|---|
| 2002/0099542 A1* | 7/2002 | Mitchell | G06F 17/289 704/231 |
| 2002/0129057 A1* | 9/2002 | Spielberg | G06F 3/165 715/201 |
| 2006/0149558 A1* | 7/2006 | Kahn | G10L 15/063 704/278 |
| 2008/0249782 A1* | 10/2008 | Ativanichayaphong | H04L 69/329 704/275 |
| 2010/0125801 A1* | 5/2010 | Shin | G06F 1/1616 715/758 |
| 2011/0060590 A1* | 3/2011 | Katae | G10L 13/10 704/260 |
| 2011/0093868 A1* | 4/2011 | Bou-Ghannam | G06F 9/542 719/318 |
| 2012/0108221 A1* | 5/2012 | Thomas | H04M 1/72522 455/415 |
| 2015/0089389 A1* | 3/2015 | Cohen-Zur | H04W 4/12 715/752 |
| 2015/0134322 A1* | 5/2015 | Cuthbert | G06F 17/289 704/3 |
| 2015/0156552 A1* | 6/2015 | Wayans | H04N 21/47205 386/230 |
| 2015/0345980 A1* | 12/2015 | Subramanian | G01C 21/3626 701/533 |
| 2015/0365306 A1* | 12/2015 | Chaudhri | G06F 3/0416 715/736 |
| 2016/0373578 A1* | 12/2016 | Klaban | H04W 4/029 |

* cited by examiner

APPLICATION-INDEPENDENT CONTENT TRANSLATION

RELATED APPLICATION

Benefit is claimed under 35 U.S.C 119(e) to US Provisional Patent Application Ser. No. 62/503,956 entitled "A METHOD FOR LITERACY AGNOSTIC COMPREHENSION AND CREATION OF TEXT BASED INFORMATION USING MOBILE DEVICES", filed on May 10, 2017.

TECHNICAL FIELD

The present disclosure relates to electronic devices, and more particularly to methods, techniques, and systems for providing application-independent content translation.

BACKGROUND

With the advancement in digitization, viewing and sharing content through portable electronic devices such as mobile phones, tablets, and the like have been significantly increased. For example, the content may be converted into digital format through digitization. Further, the digital content may be viewed on electronic devices via interactive graphical user interfaces (GUIs). Despite advancement of audio-visual technology, literacy may remain essential to create and access the content (e.g., electronic program guides, Internet pages, application data, and the like) as GUIs may be visually focused with text. This may be a hurdle for illiterate users to consume the content. Therefore, without the ability to read, write, and comprehend the digital content, individual's progress may be affected.

The drawings described herein are for illustration purposes only and are not intended to limit the scope of the present subject matter in any way.

DETAILED DESCRIPTION

Embodiments described herein may provide an enhanced method, technique, and system for application-independent content translation via a graphical user interface in an electronic device. Content translation may refer to a process of translating content from text-to-speech, speech-to-text, and/or from one language to another language across applications in an electronic device. Example electronic device may be a portable computing device such as, but not limited to, a smart phone, a portable digital assistant, a combination device, a handheld computer system, or the like. With evolving digitization, the content may be displayed or communicated in a digital form via a graphical user interface of the electronic device. The graphical user interface may disseminate the content, for instance, through textual words or phrases (e.g., menu labels, program titles and descriptions, messages, instructions for use, and the like), which may be difficult for illiterate users to consume the content.

Examples described herein may enhance user experience by providing an application, which can enable illiterate users (e.g., users who can 'see' and 'hear' but cannot 'read' or 'write') to interact with the electronic device and internet services for creating and consuming the content. Examples described herein may provide a literacy independent application to translate the content across the applications in the electronic device for content creation and comprehension. Examples described herein may receive a trigger to activate a first application in the electronic device. Upon receiving the trigger to activate the first application, the first application may display at least one visual indicator associated with the first application on a graphical user interface associated with a second application. The first application and the second application are to simultaneously run in the electronic device and the visual indicator may be superimposed on the graphical user interface. Further, content on the graphical user interface may be translated from text-to-speech or speech-to-text in response to selecting the visual indicator. Thus, examples described herein may enhance the user experience.

Text-to-speech (TTS) may refer to a form of speech synthesis that converts text into spoken voice output. For example, text-to-speech translators may form sentences and/ or phrases based on a language's graphemes and phonemes. The text-to-speech translators may read any string of text characters to form original sentences. Further, text-to-speech technology may read aloud digital text on the electronic device. Therefore, text-to-speech may enable reading of displayed content for the illiterate users or may be used to augment the reading of a text message. Speech-to-text (STT) may refer to a process that takes audio content and transcribes into written words in a word processor or other display destination. Therefore, speech-to-text may enable the illiterate users to create the content or access communication services.

System Overview and Examples of Operation

Figure 1:
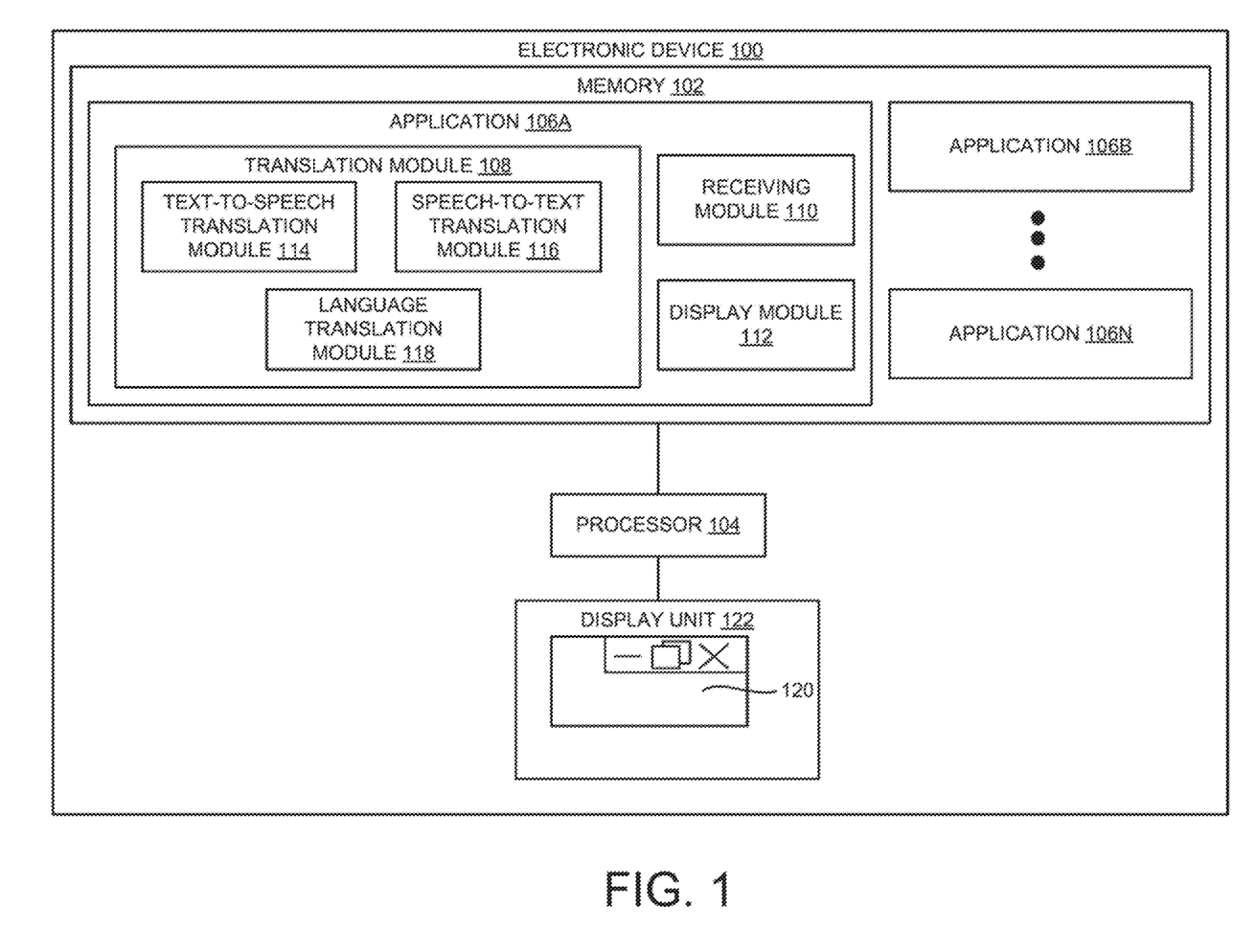
FIG. 1 is a block diagram of an example electronic device illustrating application-independent content translation.

FIG. 1 is a block diagram of an example electronic device 100 illustrating application-independent content translation. Electronic device 100 may be, but not limited to, a tablet, a mobile phone, a personal digital assistant, or any other mobile device. Further, electronic device 100 may be powered by any commercial operating system, such as Google®'s Android®, Apple®'s iPhone OS® (iOS), and the like that supports accessibility features. Furthermore, electronic device 100 may include a memory 102 and a processor 104 to execute instructions stored in memory 102.

Processor 104 may be in electronic communication with a non-transitory computer-readable storage medium (e.g., memory 102) through a high-speed memory bus, for instance. In one example, the computer-readable storage medium may be stored thereon code corresponding to multiple applications (e.g., 106A-N). Further, the code may be configured to reference data stored in a database of the non-transitory computer-readable storage medium, for example, as may be present locally or in a remote database.

In one example, memory 102 may include a first application 106A. Further, first application 106A may include a translation module 108, a receiving module 110, and a display module 112 to translate the content across other applications 106B-N. Further, translation module 108 may include a text-to-speech translation module 114, a speech-to-text translation module 116, and a language translation module 118.

During operation, receiving module 110 may receive a trigger to activate first application 106A. In one example, upon activating first application 106A, first application 106A can be launched on a graphical user interface 120. Graphical user interface 120 may provide an interface for a user to interact with electronic device 100 via input devices (e.g., touch screen). The behavior of graphical user interface 120 may be governed by computer executable instructions that are executed when the user interacts with graphical user interface 120. Further, graphical user interface 120 can be rendered through a display unit 122.

Furthermore, graphical user interface 120 may be associated with one of other applications 106B-N (e.g., herein referred to as a second application 106B). Further, first application 106A and second application 106B may simultaneously run in electronic device 100. In one example, first application 106A may use accessibility application programming interface (API) provided by the operating system of electronic device 100 to access the content of the second application 106B without tweaking or modifying the operating system.

Display module 112 may display at least one visual indicator associated with first application 106A on graphical user interface 120 associated with second application (e.g., 106B) upon activating first application 106A. Example visual indicators may be selected from a group including a text-to-speech translation icon, a speech-to-text translation icon, and a settings icon. For example, the text-to-speech translation icon, the speech-to-text translation icon, and the settings icon may be designed to convey the outcome of operating the visual indicators. Visual indicators are explained with an example in FIG. 2A.

Translation module 108 may translate content on graphical user interface 120 from text-to-speech or speech-to-text in response to selecting the at least one visual indicator. In one example, text-to-speech translation module 114 may translate the content from text-to-speech in response to a selection of the text-to-speech icon. The translated content may be outputted via an audio output device. Further, text-to-speech translation module 114 may provide a play or pause icon on graphical user interface 120 to play or pause the translated content during outputting of the translated content. Translating the content from text-to-speech and outputting the translated content are described in FIG. 2A.

In another example, speech-to-text translation module 116 may translate the content from speech-to-text in response to a selection of the speech-to-text translation icon. Further, the translated content may be displayed on graphical user interface 120 of display unit 122. In one example, speech-to-text translation module 116 may provide an editing icon on graphical user interface 120 to edit the displayed translated content and a read-out icon on graphical user interface 120 to read-out the displayed translated content. Translating the content from speech-to-text and displaying the translated content are described in FIG. 2B.

In some examples, language translation module 118 may translate the content from a first language to a second language (e.g., a preferred language) during content translation (e.g., during the text-to-speech or speech-to-text translation). Setting or predefining preferred languages for translation is described in FIG. 3H.

Further, the visual indicators and the icons described herein may be superimposed on any content of interest (e.g., the content associated with second application 106B) allowing simultaneous usage of first application 106A and second application 106B that is displaying the content on graphical user interface 120. Therefore, first application 106A may provide illiterate users to intuitively consume or access text-based content available on electronic device 100 and create text in any language.

In some examples, the functionalities described herein, in relation to instructions to implement functions of translation module 108, receiving module 110, display module 112, and any additional instructions described herein in relation to the storage medium, may be implemented as engines or modules comprising any combination of hardware and programming to implement the functionalities of the modules or engines described herein. The functions of translation module 108, receiving module 110, and display module 112 may also be implemented by a respective processor. In examples described herein, the processor may include, for example, one processor or multiple processors.

Figure 2A:
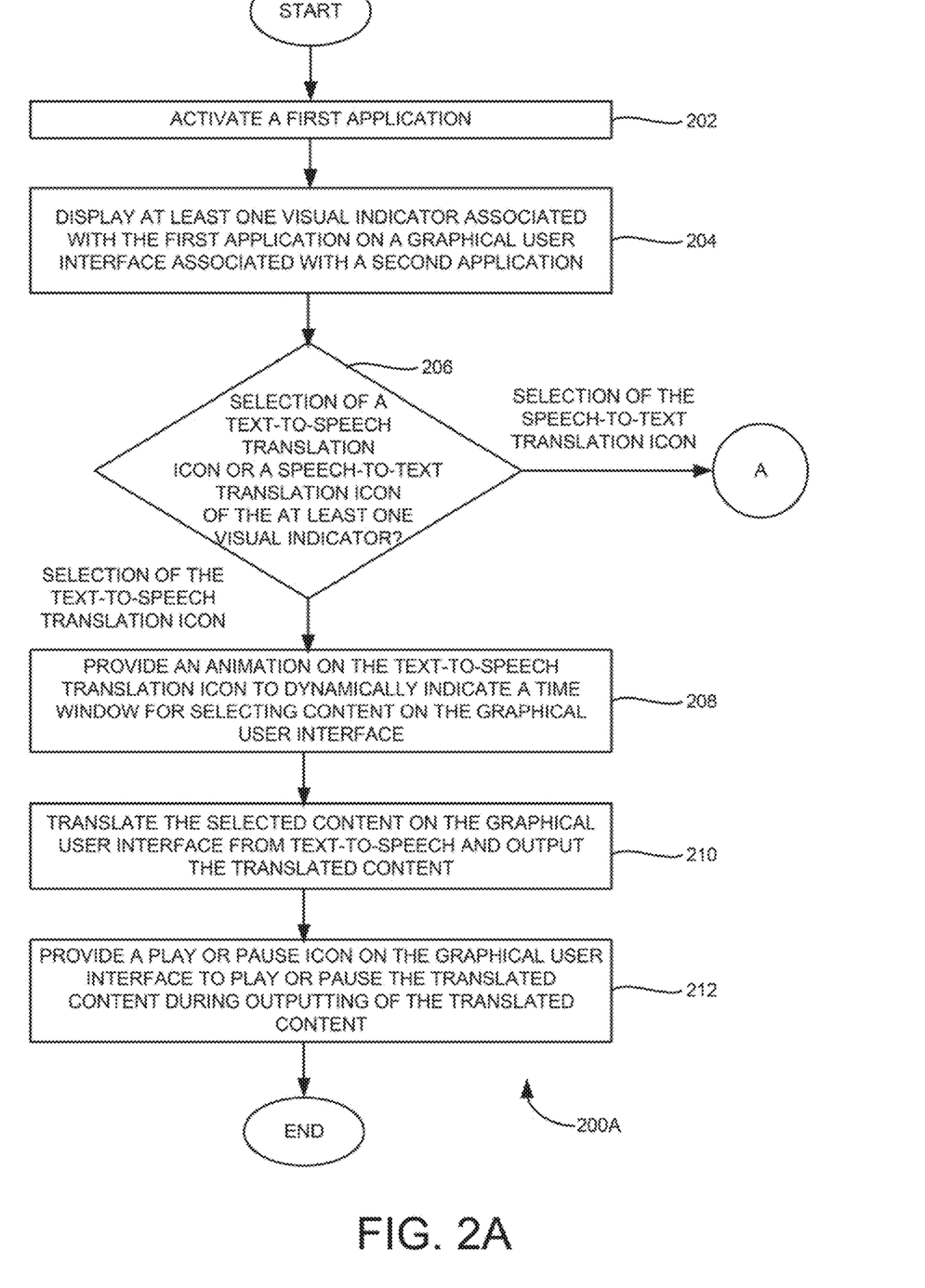
FIG. 2A is an example flow diagram illustrating translating content on a graphical user interface from text-to-speech.

FIG. 2A is an example flow diagram 200A illustrating translating content on a graphical user interface from text-to-speech. At 202, a first application may be activated. Activation may be referred as a process of making the first application operational. For example, the first application may be activated by default during start or boot up of an electronic device and/or anytime while the electronic device is in operation by a user. In one example, a graphical indicator may be displayed on the graphical user interface of the electronic device when the first application is activated as shown in FIG. 3A.

Figure 3A:
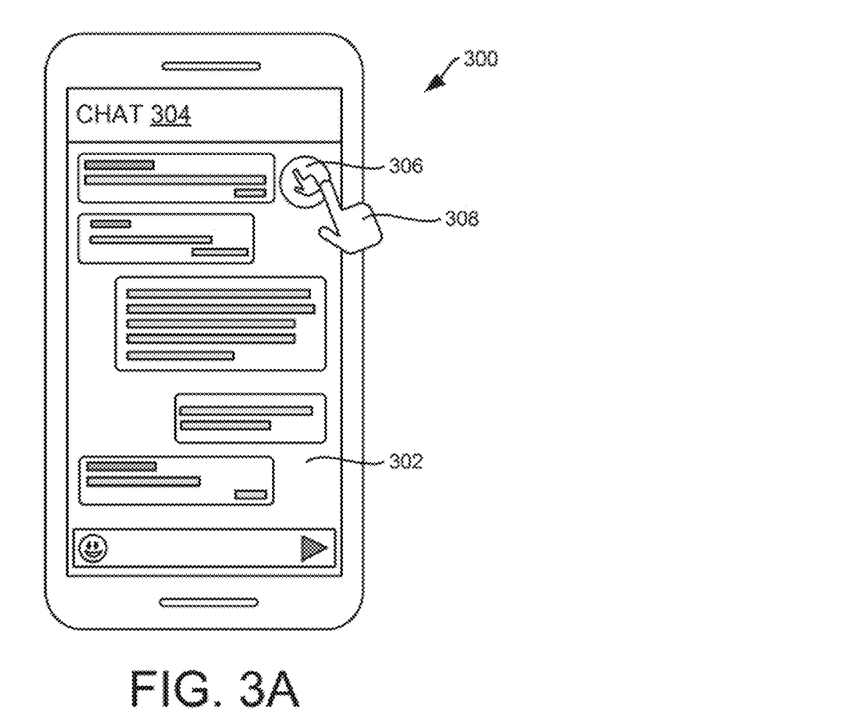
FIG. 3A shows an example mobile phone displaying a graphical indicator on a graphical user interface associated with a second application.

FIG. 3A shows an example mobile phone 300 displaying a graphical indicator 306 on a graphical user interface 302 associated with a second application (e.g., chat 304). Graphical user interface 302 may display content associated with second application 304. Example content may include text, images (e.g., scanned copies), or a combination thereof, to be displayed to the user. The user may interact with mobile phone 300 through graphical user interface 302 to access the content associated with second application 304.

In one example, when a first application is activated, graphical indicator 306 associated with the first application may be displayed on graphical user interface 302. Further, the first application and second application 304 may simultaneously run in mobile phone 300. Graphical indicator 306 may be superimposed on graphical user interface 302 associated with second application 304. For example, graphical indicator 306 may be a graphic symbol designed to convey the outcome of graphical indicator 306. When a user desires to translate content on graphical user interface 302, the user may select (e.g., as shown by 308) the graphical indicator 306 as shown in FIG. 3A.

Referring to FIG. 2A, at 204, at least one visual indicator associated with the first application may be displayed on the graphical user interface associated with the second application. For example, the at least one visual indicator may be selected from a group including a text-to-speech translation icon, a speech-to-text translation icon, and a settings icon. In one example, the first application may be sensitive to the context of the content displayed by the second application. For example, a read only graphical user interface of the second application may not show the speech-to-text translation icon. Further, when the graphical user interface of the second application can be read and includes a text input option, the first application displays both text-to-speech translation icon and the speech-to-text translation icon. Example visual indicators are shown in FIG. 3B.

Figure 3B:
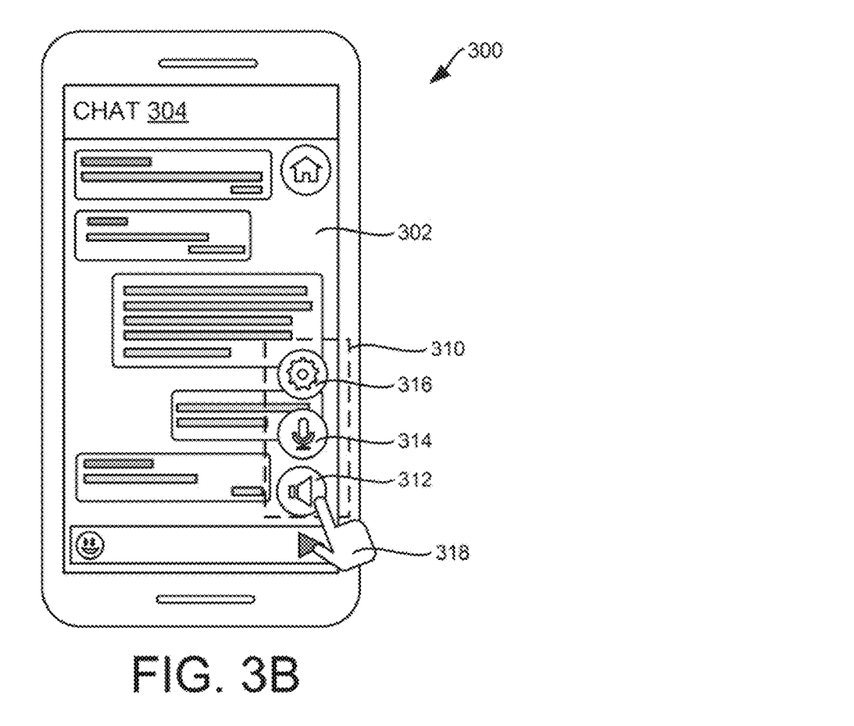
FIG. 3B shows the example mobile phone displaying visual indicators on the graphical user interface associated with the second application.

FIG. 3B shows mobile phone 300 displaying visual indicators 310 on graphical user interface 302 associated with second application 304. Visual indicators 310 may be displayed based on selection of graphical indicator 306 as shown in FIG. 3A. In one example, visual indicators 310 may be superimposed on graphical user interface 302. Visual indicators 310 may include a text-to-speech translation icon 312 (e.g., a speaker icon), a speech-to-text translation icon 314 (e.g., a microphone icon), and a settings icon 316. Further, the user may select one of visual indicators 310 for translating the content on graphical user interface 302. In the example depicted in FIG. 3B, the user selects (e.g., as shown by 318) text-to-speech translation icon 312 to initiate text-to-speech translation.

At 206 of FIG. 2A, a check is made to determine whether the user selects the text-to-speech translation icon or the speech-to-text translation icon. When the selection of the text-to-speech translation icon is received, an animation may be provided on the text-to-speech translation icon to dynamically indicate a time window for selecting content on the graphical user interface, at 208. An example graphical user interface for selecting the content is shown in FIG. 3C.

Figure 3C:
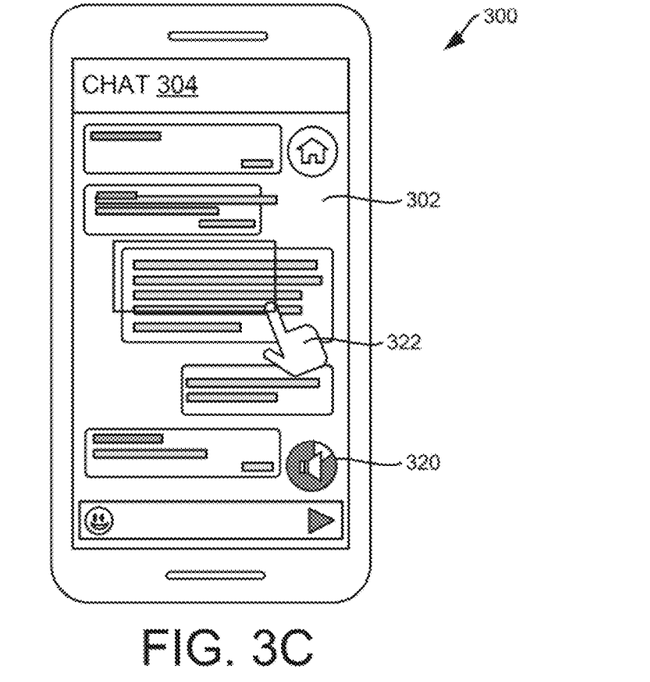
FIG. 3C shows the example mobile phone displaying an animated text-to-speech translation icon on the graphical user interface associated with the second application.

FIG. 3C shows mobile phone 300 displaying an animated text-to-speech translation icon 320 on graphical user interface 302 associated with second application 304. For example, a time window may be provided for the user to provide input for text-to-speech translation. The time window may be graphically represented by animated text-to-speech translation icon 320. Within the time window, the user may select (e.g., 322) the content displayed on graphical user interface 302 for translation. Further, an option may be provided to pause the time window to gain time and/or to operate second application 304.

Figure 3D:
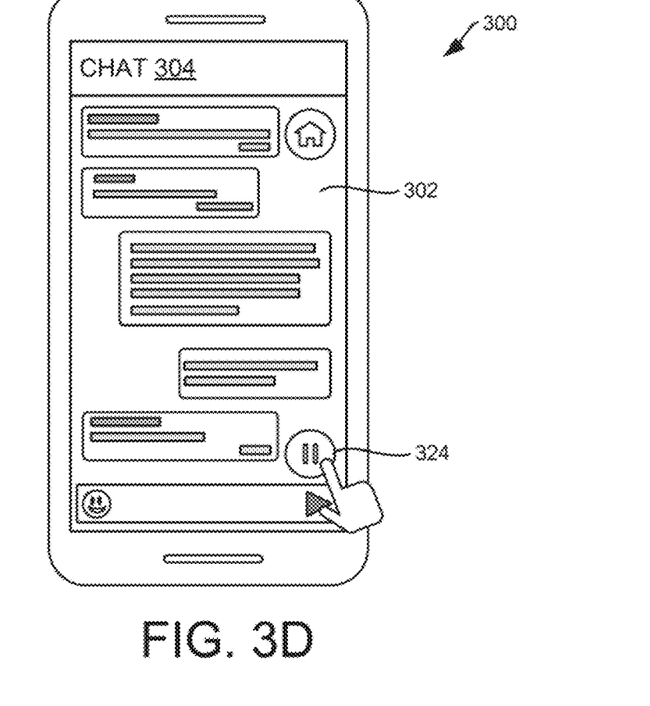
FIG. 3D shows the example mobile phone displaying a pause icon on the graphical user interface associated with the second application to pause translated content.
Figure 3E:
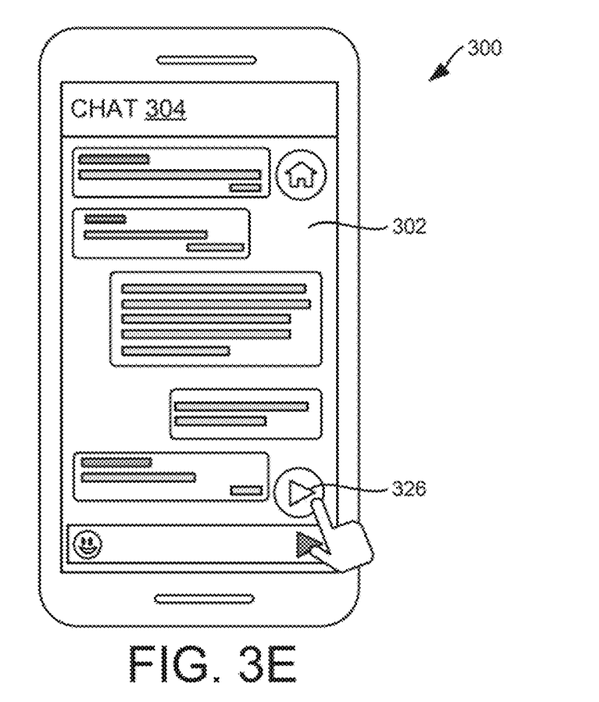
FIG. 3E shows the example mobile phone displaying a play icon on the graphical user interface associated with the second application to play the translated content.

At 210 of FIG. 2A, the selected content on the graphical user interface may be translated from text-to-speech. Translating the content from text-to-speech is described in FIGS. 4A, 4C and 4D. Further, the translated content may be outputted. At 212, a play or pause icon may be provided on the graphical user interface to play or pause the translated content during outputting of the translated content. Example pause icon and play icon are shown in FIGS. 3D and 3E. FIG. 3D shows mobile phone 300 displaying a pause icon 324 on graphical user interface 302 associated with second application 304 to pause translated content. FIG. 3E shows mobile phone 300 displaying a play icon 326 on graphical user interface 302 associated with second application 304 to play the translated content. In one example, pause icon 324 and play icon 326 may enable the user to pause and play the translated content during the read-out of the outputted translated content. In one example, the outputted translated content may be read-out from the beginning or starting of the sentence when paused (e.g., by selecting pause icon 324) and then played (e.g., by selecting play icon 324). Play icon 324 and pause icon 324 may be superimposed on graphical user interface 302.

Figure 2B:
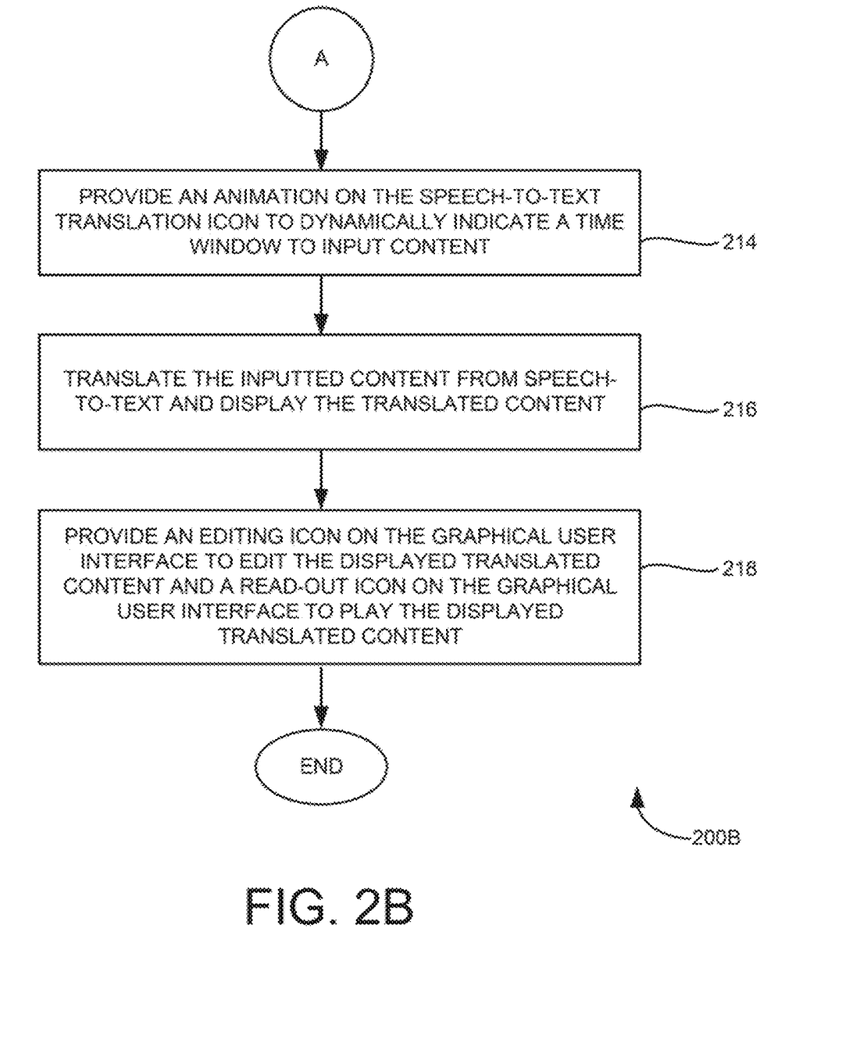
FIG. 2B is an example flow diagram illustrating translating the content from speech-to-text.
Figure 3F:
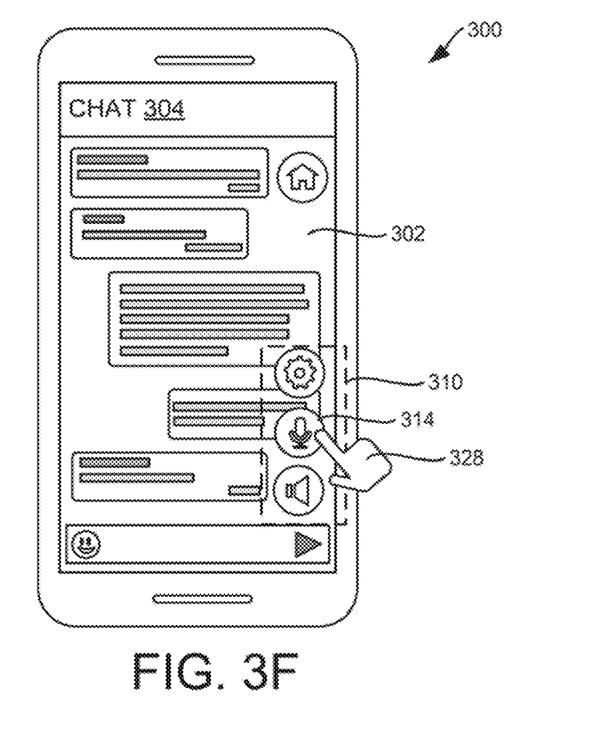
FIG. 3F shows the example mobile phone displaying the visual indicators on the graphical user interface associated with the second application.

FIG. 2B is an example flow diagram 200B illustrating translating content from speech-to-text. At 214, when the selection of the speech-to-text translation icon is received (e.g., at 206 of FIG. 2A), an animation may be provided on the speech-to-text translation icon to dynamically indicate a time window to input voice content. An example graphical user interface depicting selection of the speech-to-text translation icon is shown in FIG. 3F. FIG. 3F shows mobile phone 300 displaying visual indicators 310 on graphical user interface 302 associated with second application 304. In the example depicted in FIG. 3F, the user selects (e.g., at 328) speech-to-text translation icon 314 to initiate speech-to-text translation. Further, a time window may be provided for the user to provide input for speech-to-text translation. The time window may be graphically represented by animating the speech-to-text translation icon 314. Within the time window, the user may input the voice content for translation.

At 216 of FIG. 2B, the inputted content may be translated from speech-to-text. Speech-to-text translation is described in FIGS. 4B and 4E. Further, the translated content may be displayed on the graphical user interface of the second application. At 218, an editing icon may be provided on the graphical user interface to edit the displayed translated content. Further at 218, a read-out icon may be provided on the graphical user interface to play the displayed translated content. In one example, the editing icon may receive a request to edit the displayed translated content, play a portion of the displayed translated content corresponding to the request, and modify the displayed translated content based on user instructions upon playing the edited translated content. Example editing icon and the read-out icon are shown in FIG. 3G.

Figure 3G:
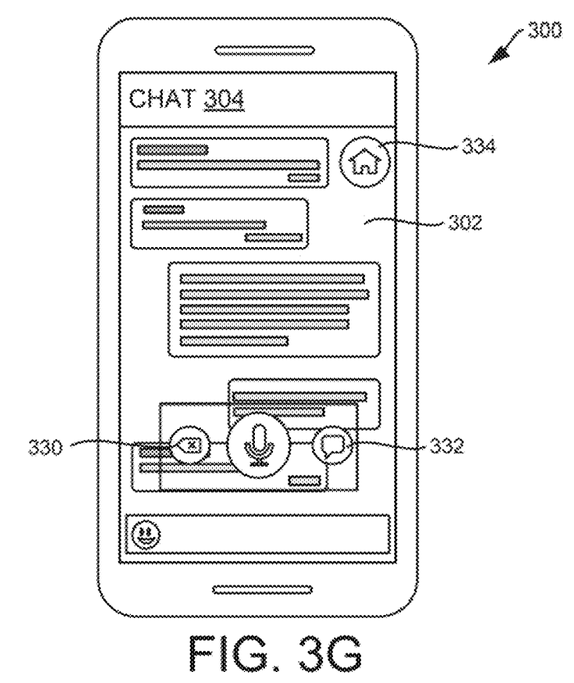
FIG. 3G shows the example mobile phone displaying an editing icon and a read-out icon on the graphical user interface associated with the second application.

FIG. 3G shows mobile phone 300 displaying an editing icon 330 and a read-out icon 332 on graphical user interface 302 associated with second application 304. Editing icon 330 and read-out icon 332 may be superimposed on graphical user interface 302 upon performing speech-to-text translation. For example, editing icon 330 may delete word by word in the translated content. Further, editing icon 330 may read-out the word that is about to be deleted for the user as the user may need to hear the text that was generated from the input provided to ensure correctness and comprehension. Read-out icon 332 functionality may be enabled by a speech bubble button to play the displayed translated content based on user instructions, for instance, as shown in FIG. 3G. Further, a graphical icon 334 (e.g., a home icon) may be provided on graphical user interface 302. For example, upon selection of graphical icon 334, graphical indicator 306 of FIG. 3A may be displayed on graphical user interface 302.

Figure 3H:
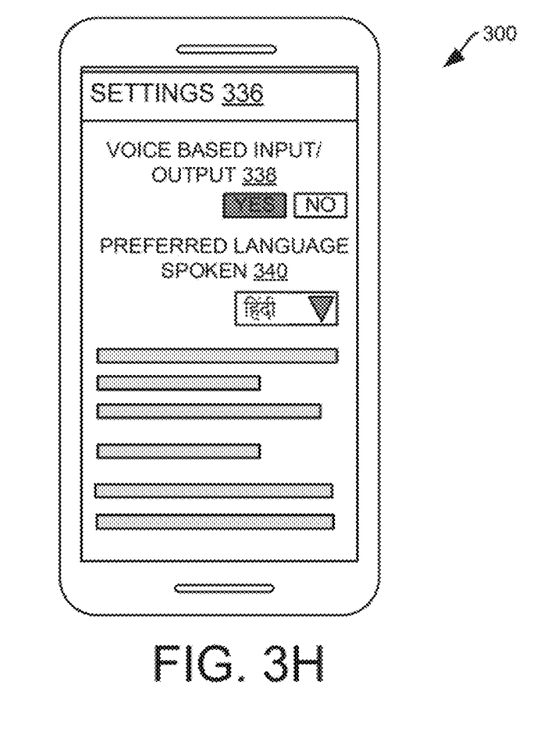
FIG. 3H shows the example mobile phone displaying voice and language settings associated with a setting icon.

FIG. 3H shows mobile phone 300 displaying voice and language settings associated with a setting icon. When the setting icon (e.g., setting icon 316 of FIG. 3B) is selected, different setting options 336 may be provided on mobile phone 300. For example, an option to choose voice-based input/output 338 may be provided. Further, an option to choose a preferred language 340 may be provided. In other words, a setting to enable the workaround may include turning on voice input and output mode (e.g., 338) and selecting the language the user speaks (e.g., 340) (i.e., the preferred language). Upon choosing preferred language 340, a language translation module (e.g., language translation module 118 of FIG. 1) may be updated and based on the preferred language, content may be translated. In one example, the options provided for settings 336 may be set by default based on geographic location of the user or may be set manually. Further, upon setup (e.g., 338 and 340), mobile phone 300 may change the default language to the one spoken by the user (i.e., the preferred language). To comprehend commands, instructions, the content, and the like appearing on graphical user interface 302, the user may have to select the text (e.g., by swiping finger across the text) as described in FIG. 3C.

For example, consider the content associated with a news application is displayed on graphical user interface 302 of mobile phone 300 in user's spoken language, e.g., Hindi. To listen to the displayed content, the user may need to select the content by swiping across the content or text. Further, text-to-speech translation module of mobile phone 300 may be trigged to convert the text to speech for the user to hear the content in Hindi.

In another example, not all the content may be in a language that the user understands. For example, the content associated with the news application may be displayed in a language that the user is not familiar, e.g., English. To read or consume the content, the user may need to select the text. Further, the content in English may be translated into user's spoken language (i.e., Hindi) and then the translated text is converted from text to speech, for the user to listen.

The embodiments described also can be practiced without some of the specific details described herein, or with other specific details, such as changes with respect to the ordering of the logic, different logic, different architectures, or the like. Thus, the scope of the techniques and/or functions described is not limited by the particular order, selection, or decomposition of aspects described with reference to any particular routine, module, component, or the like.

Figure 4A:
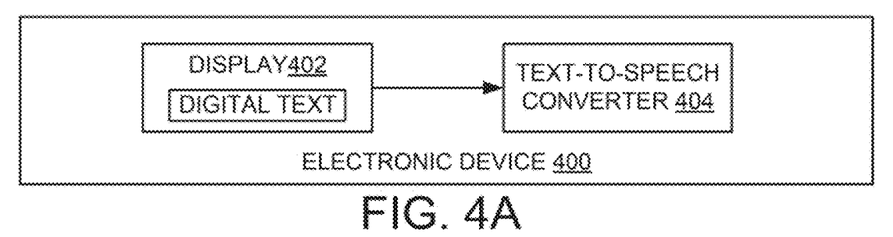
FIG. 4A is a block diagram of an example electronic device illustrating text-to-speech translation.

FIG. 4A is a block diagram of an example electronic device 400 illustrating text-to-speech translation. Electronic device 400 may include a display 402, where digital text may be displayed via a graphical user interface. In one example, the digital text may be stored locally in electronic device 400 and/or electronic device may access the digital text over the Internet. Further, a text-to-speech converter 404 may translate or convert the digital text into speech as described in FIG. 1. Therefore, through text-to-speech translation, an illiterate user may comprehend text stored locally on electronic device 400 or accessed over the internet by listening to the output of text-to-speech convertor 404.

Figure 4B:
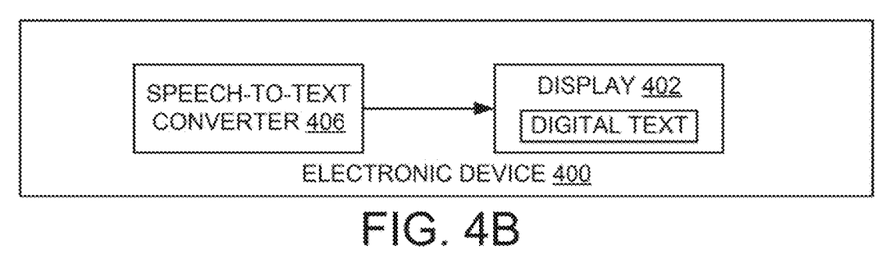
FIG. 4B is the block diagram of the example electronic device illustrating speech-to-text translation.

FIG. 4B is a block diagram of example electronic device 400 illustrating speech-to-text translation. Electronic device 400 may include speech-to-text converter 406 to receive spoken words or speech and convert the spoken words into digital text as described in FIG. 1. Further, the converted digital text may be displayed on display 402 of electronic device 400. Therefore, through speech-to-text translation, the illiterate user may be able to write text.

Figure 4C:
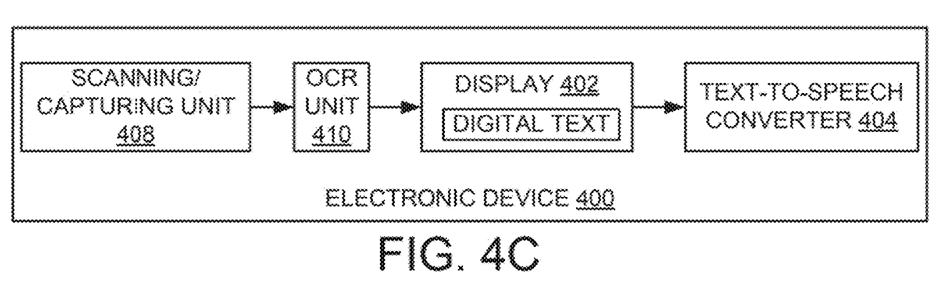
FIG. 4C is the block diagram of the example electronic device illustrating text-to-speech translation using optical character recognition (OCR)

FIG. 4C is a block diagram of example electronic device 400 illustrating text-to-speech translation. For example, not all text may be in digital format. A significant percentage of the text may be captured as prints on paper. In order to make the printed content readable for the illiterate users, the text on the paper may need to be converted to digital format and fed into electronic device 400 for processing. In one example, electronic device 400 may include a scanning/capturing unit 408 to scan or capture the text or content on the physical paper. Then, an optical character recognition (OCR) unit 410 may convert the captured text into machine-encoded text (e.g., digital text), which may be displayed on display 402. Further, text-to-speech converter 404 may translate the displayed text into speech as described in FIG. 1.

Figure 4D:
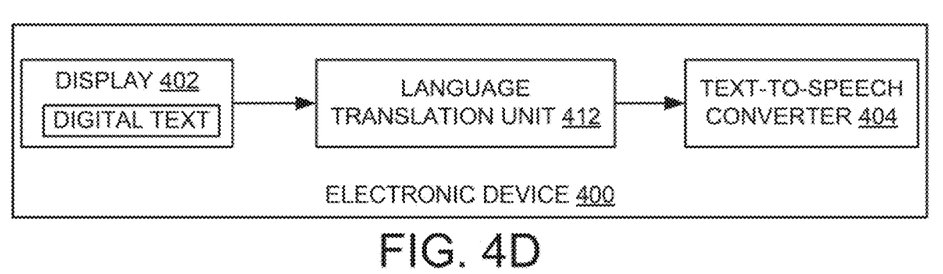
FIG. 4D is the block diagram of the example electronic device illustrating text-to-speech translation in a preferred language.

FIG. 4D is a block diagram of example electronic device 400 illustrating text-to-speech translation in a preferred language. For example, a significant amount of content may not always be in a language one speaks. For illiterate users, understanding text in a language they do not even speak or understand is an added problem. However, even in these scenarios, it may be possible to let illiterate users read in a language that they do not know and widen the choice of information gathering. A language translation unit 412 may assist in outputting the speech in a language preferred by the user even though digital text provided for the text-to-speech is in different language. For example, the digital text displayed on display 402 may be translated to the preferred language and then the translated digital text may be fed to text-to-speech converter 404 for further translating as described in FIG. 1.

Figure 4E:
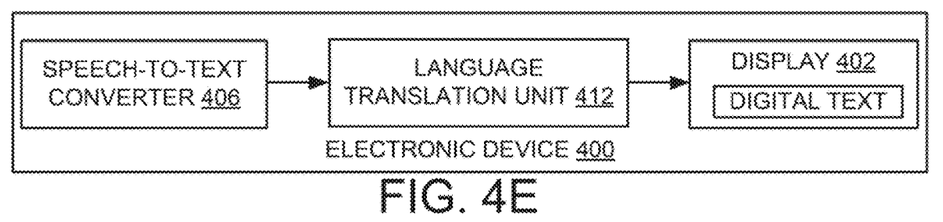
FIG. 4E is the block diagram of the example electronic device illustrating speech-to-text translation in the preferred language.

FIG. 4E is a block diagram of example electronic device 400 illustrating speech-to-text translation in a preferred language. For example, being able to write in a language of necessity, however, without knowing the language can make a significant difference especially in countries with multiple official languages and some being more in vogue than others. Even in these scenarios, it may be possible to let illiterate users write in a language that they do not know. A language translation unit 412 may assist in displaying the text in a language preferred by the user even though speech inputted for the speech-to-text is in different language. For example, the speech inputted for translation may be translated to digital text by speech-to-text converter 406 and then the translated digital text may be translated into the preferred language by language translation unit 412. Further, the translated digital text may be displayed on display 402.

Example Processes

Figure 5:
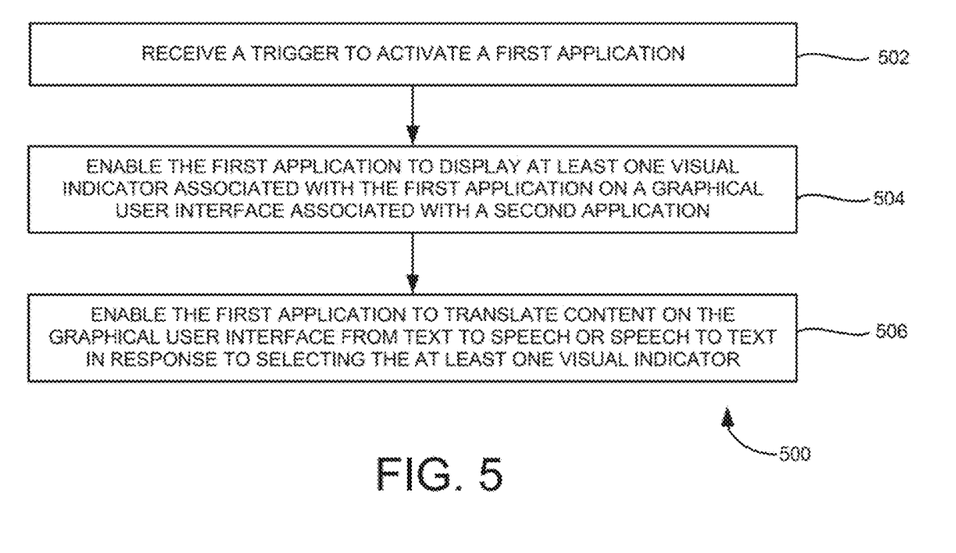
FIG. 5 is an example flow diagram illustrating application-independent content translation in an electronic device.

FIG. 5 is an example flow diagram 500 illustrating application-independent content translation in an electronic device. It should be understood that the process depicted in FIG. 5 represents generalized illustrations, and that other processes may be added, or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

At 402, a trigger may be received to activate a first application. At 404, upon receiving the trigger to activate the first application, the first application may be enabled to display at least one visual indicator associated with the first application on a graphical user interface associated with a second application. The first application and the second application are to simultaneously run in the electronic device and the at least one visual indicator may be superimposed on the graphical user interface.

At 406, the first application may be enabled to translate content on the graphical user interface from text-to-speech or speech-to-text in response to selecting the at least one visual indicator. The first application may access the second application via an accessibility API to translate the content associated with the second application without tweaking or modifying the operating system.

Figure 6:
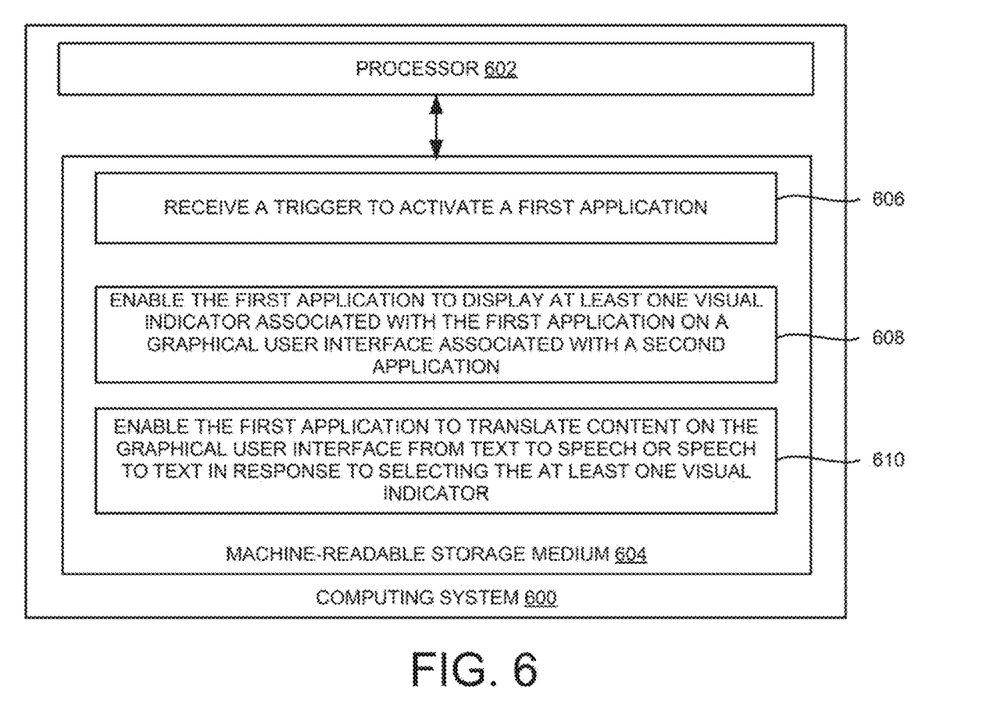
FIG. 6 is a block diagram of an example computing system including non-transitory computer-readable storage medium, storing instructions to provide application-independent content translation.

FIG. 6 is a block diagram of an example computing system 600 (e.g., electronic device 100 of FIG. 1) including non-transitory computer-readable storage medium, storing instructions to provide application-independent content translation. The computing system 600 may include a processor 602 and a machine-readable storage medium 604 communicatively coupled through a system bus. The processor 602 may be any type of central processing unit (CPU), microprocessor, or processing logic that interprets and executes machine-readable instructions stored in the machine-readable storage medium 604. The machine-readable storage medium 604 may be a random-access memory (RAM) or another type of dynamic storage device that may store information and machine-readable instructions that may be executed by the processor 602. For example, the machine-readable storage medium 604 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, the machine-readable storage medium 604 may be a non-transitory machine-readable medium. In an example, the machine-readable storage medium 604 may be remote but accessible to computing system 600.

The machine-readable storage medium 604 may store instructions 606-610. In an example, instructions 606-610 may be executed by processor 602 for translating the content across the applications. Instructions 606 may be executed by processor 602 to receive a trigger to activate a first application. Instructions 608 may be executed by processor 602 to enable the first application to display at least one visual indicator associated with the first application on a graphical user interface associated with a second application. Further, instructions 610 may be executed by processor 602 to enable the first application to translate content on the graphical user interface from text-to-speech or speech-to-text in response to selecting the at least one visual indicator.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. An electronic device, comprising:
a display unit;
at least one processor;
memory coupled to the at least one processor; and
a first application stored in the memory and configured to be executed by the at least one processor, the first application comprises:
a receiving module to receive a trigger to activate the first application;
a display module to display, on the display unit, at least one visual indicator associated with the first application on a graphical user interface associated with a second application upon activating the first application, wherein the first application and the second application are to simultaneously run in the electronic device and the at least one visual indicator associated with the first application is superimposed on the graphical user interface associated with the second application; and a translation module to translate content on the graphical user interface associated with the second application from text-to-speech or to translate input speech from speech-to-text in response to selecting the at least one visual indicator associated with the first application.

2. The electronic device of claim 1, wherein the at least one visual indicator is selected from a group comprising a text-to-speech translation icon, a speech-to-text translation icon, and a settings icon.

3. The electronic device of claim 2, wherein the translation module comprises:

a text-to-speech translation module to translate the content from text-to-speech in response to a selection of the text-to-speech translation icon and output the translated content; and a speech-to-text translation module to translate the input speech from speech-to-text in response to a selection of the speech-to-text translation icon and display the translated text on the graphical user interface of the display unit.

4. The electronic device of claim 3, wherein the display module is to:

provide an animation on the text-to-speech translation icon to dynamically indicate a time window for selecting the content on the graphical user interface for translating the content from text-to-speech; and provide an animation on the speech-to-text translation icon to dynamically indicate a time window for inputting the speech for translating the speech from speech-to-text.

5. The electronic device of claim 3, wherein the text-to-speech translation module is to:

provide a play or pause icon on the graphical user interface to play or pause the translated content during outputting of the translated content.

6. The electronic device of claim 3, wherein the speech-to-text translation module is to:

provide an editing icon on the graphical user interface, wherein the editing icon is to:
receive a request to edit the displayed translated text;
play a portion of the displayed translated text corresponding to the request; and
modify the displayed translated text on the display unit based on user instructions upon playing the edited translated text; and provide a read-out icon on the graphical user interface, wherein the read-out icon is to play the displayed translated text.

7. The electronic device of claim 3, wherein the translation module further comprises:

a language translation module to translate the content from a first language to a second language during translation of the content.

8. The electronic device of claim 1, wherein the first application is to access the second application via an accessibility application programming interface (API) to translate the content associated with the second application.

9. A non-transitory machine-readable storage medium encoded with instructions that, when executed by a processor, cause the processor to:

receive a trigger to activate a first application; and
enable the first application, upon receiving the trigger to activate the first application, to:
display at least one visual indicator associated with the first application on a graphical user interface associated with a second application, wherein the first application and the second application are to simultaneously run in an electronic device and the at least one visual indicator associated with the first application is superimposed on the graphical user interface associated with the second application; and
translate content on the graphical user interface associated with the second application from text-to-speech or to translate input speech from speech-to-text in response to selecting the at least one visual indicator associated with the first application.

10. The non-transitory machine-readable storage medium of claim 9, wherein the first application is to access the second application via an accessibility application programming interface (API) to translate the content associated with the second application.

11. The non-transitory machine-readable storage medium of claim 9, wherein the at least one visual indicator is selected from a group comprising a text-to-speech translation icon, a speech-to-text translation icon, and a settings icon.

12. The non-transitory machine-readable storage medium of claim 11, wherein translating the content comprises:

translating the content from text-to-speech in response to a selection of the text-to-speech translation icon and outputting the translated content; and translating the input speech from speech-to-text in response to a selection of the speech-to-text translation icon and displaying the translated text.

13. The non-transitory machine-readable storage medium of claim 12, wherein translating the content from text-to-speech further comprises:

providing a play or pause icon on the graphical user interface to play or pause the translated content during outputting of the translated content.

14. The non-transitory machine-readable storage medium of claim 12, wherein translating the input speech from speech-to-text further comprises:

providing an editing icon on the graphical user interface, wherein the editing icon is to:
receive a request to edit the displayed translated text;
play a portion of the displayed translated text corresponding to the request; and
modify the displayed translated text based on user instructions upon playing the edited translated text; and providing a read-out icon on the graphical user interface associated with the second application, wherein the read-out icon is to play the displayed translated text.

15. A method, comprising:

receiving a trigger to activate a first application; and
enabling the first application, upon receiving the trigger to activate the first application, to:
display at least one visual indicator associated with the first application on a graphical user interface associated with a second application, wherein the first application and the second application are to simultaneously run in an electronic device and the at least one visual indicator associated with the first application is superimposed on the graphical user interface associated with the second application; and translate content on the graphical user interface associated with the second application from text-to-speech or to translate input speech from speech-to-text in response to selecting the at least one visual indicator associated with the first application.

16. The method of claim 15, wherein the first application is to access the second application via an accessibility application programming interface (API) to translate the content associated with the second application.

17. The method of claim 15, wherein the at least one visual indicator is selected from a group comprising a text-to-speech translation icon, a speech-to-text translation icon, and a settings icon.

18. The method of claim 17, wherein translating the content comprises:

translating the content from text-to-speech in response to a selection of the text-to-speech translation icon and outputting the translated content; and translating the input speech from speech-to-text in response to a selection of the speech-to-text translation icon and displaying the translated text.

19. The method of claim 18, wherein translating the content from text-to-speech further comprises:

providing a play or pause icon on the graphical user interface to play or pause the translated content during outputting of the translated content.

20. The method of claim 18, wherein translating the input speech from speech-to-text further comprises:

providing an editing icon on the graphical user interface, wherein the editing icon is to:
receive a request to edit the displayed translated text;
play a portion of the displayed translated text corresponding to the request; and
modify the displayed translated text based on user instructions upon playing the edited translated text; and providing a read-out icon on the graphical user interface, wherein the read-out icon is to play the displayed translated text.

* * * * *